Oct. 29, 1929.  C. R. HULTGREN  1,733,734
PRESS DEVICE
Filed June 6, 1927  3 Sheets-Sheet 1
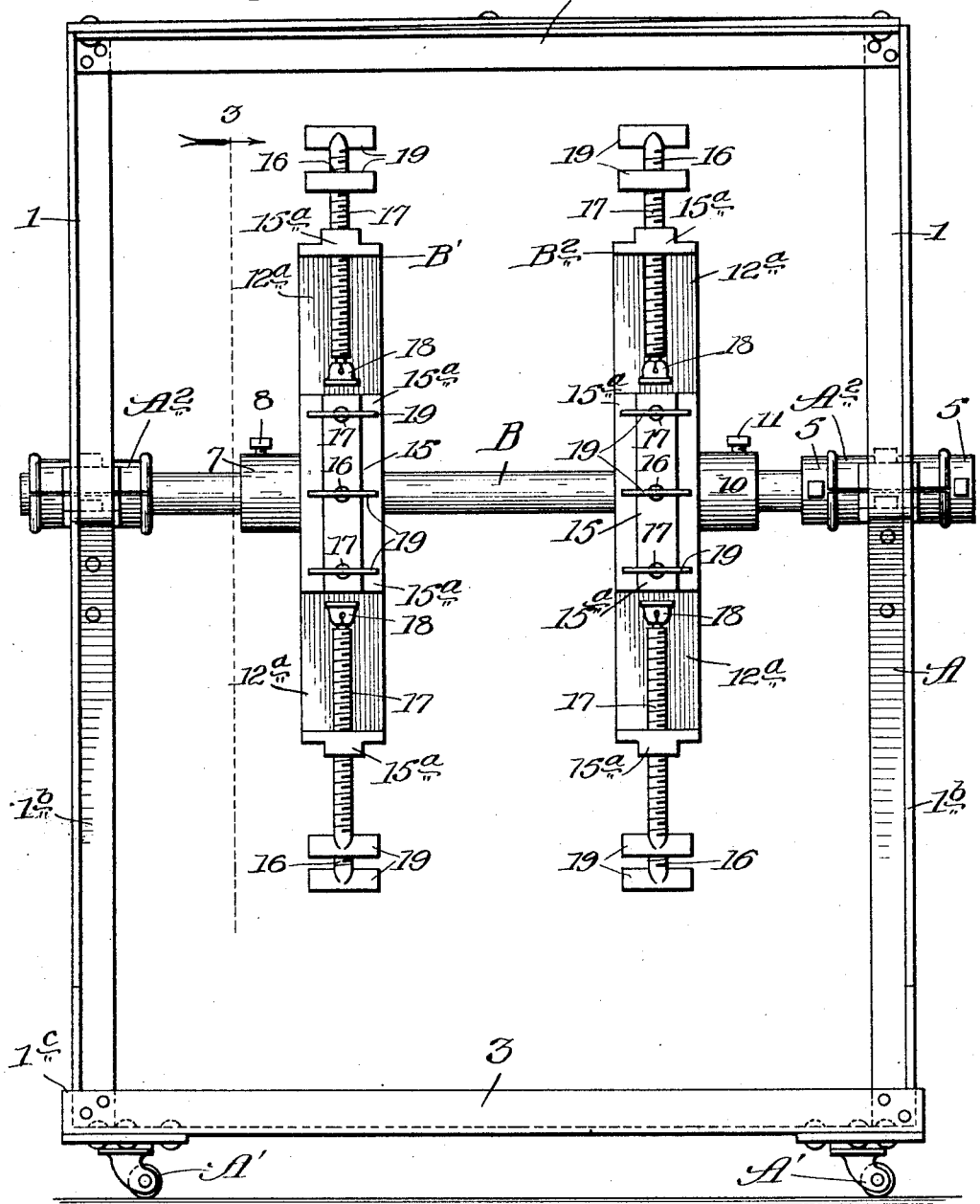
Inventor:
Charles R. Hultgren,
By Dyrenforth, Lee, Chritton & Wiles,
Attys.

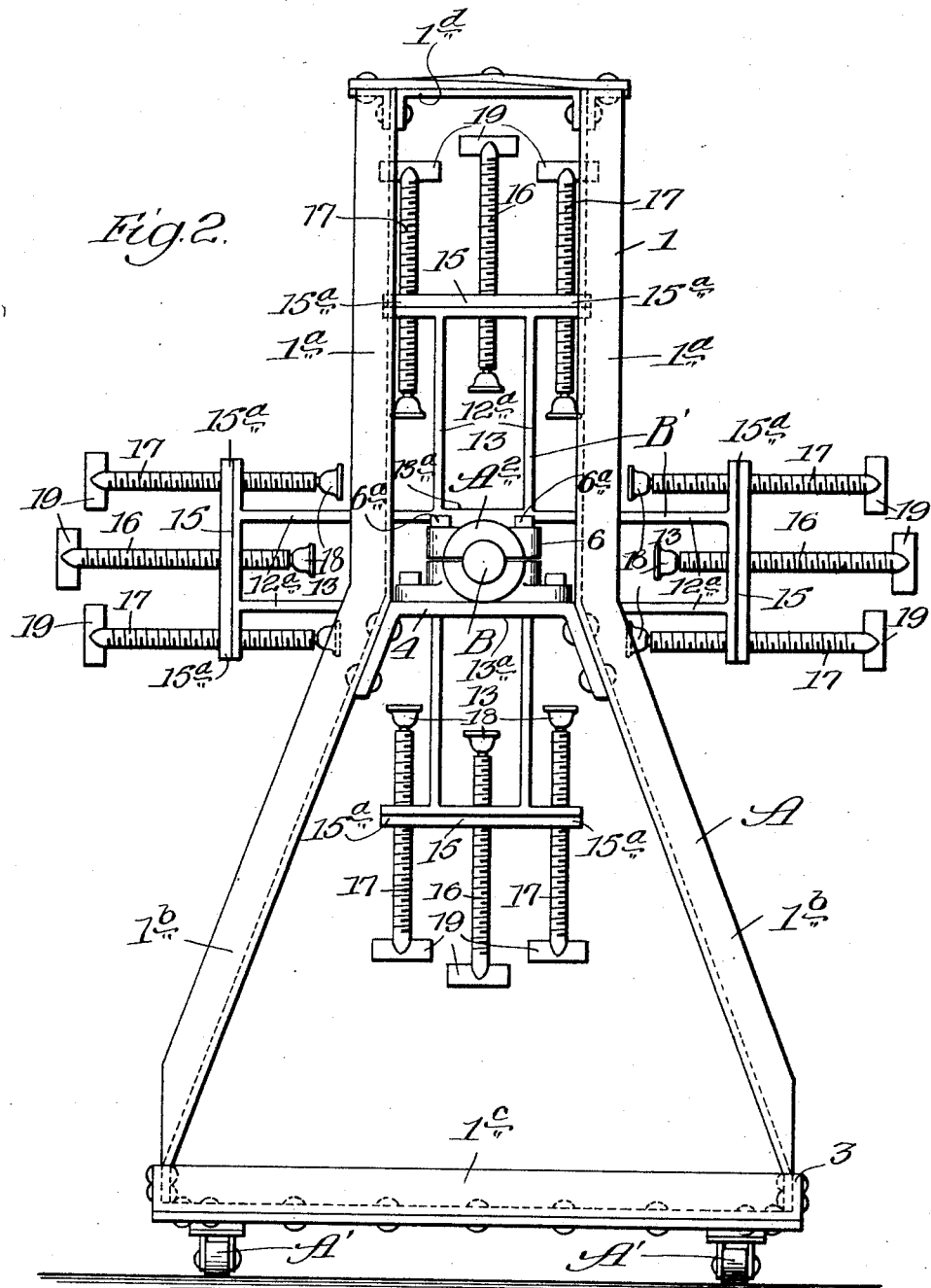

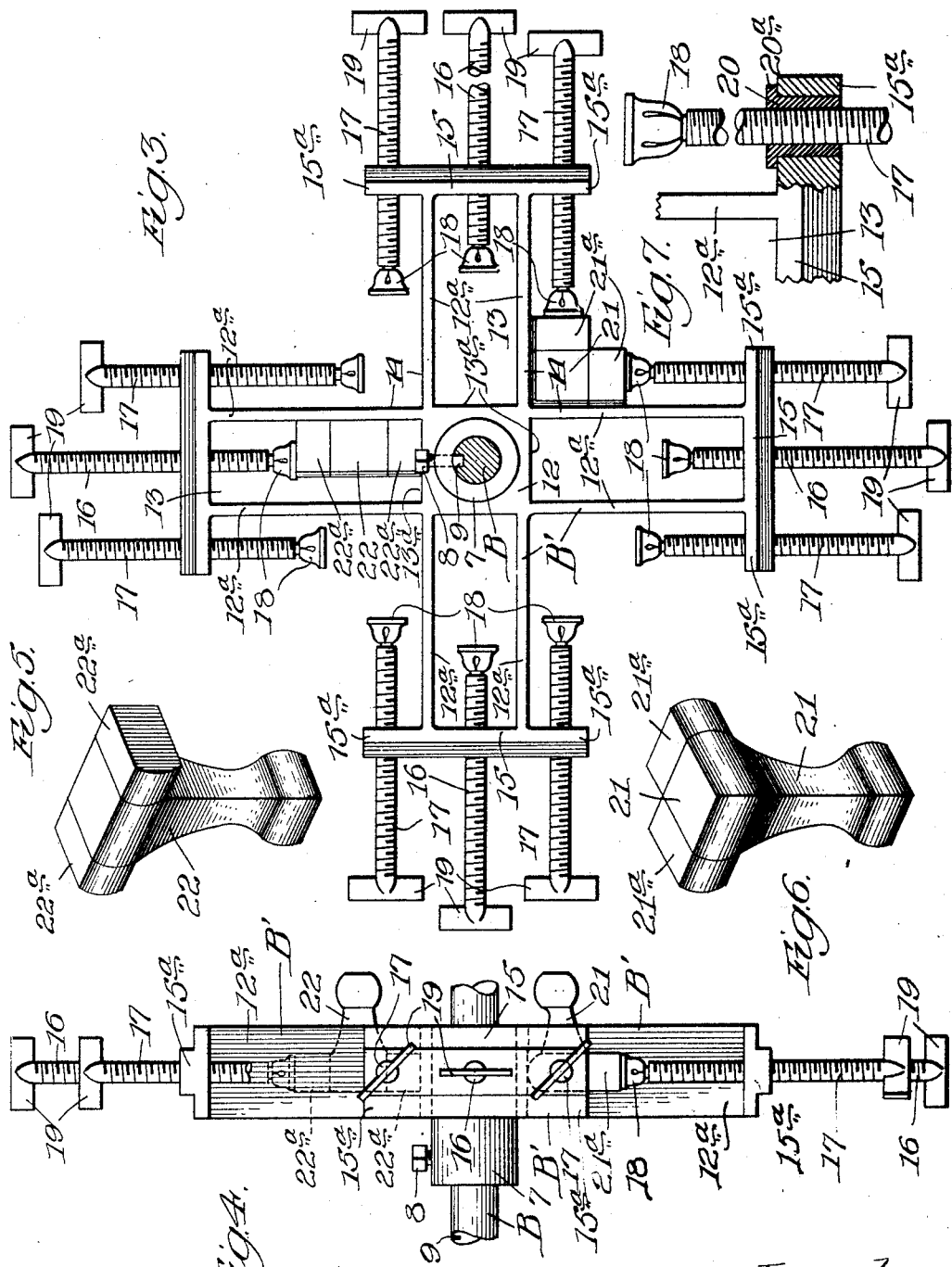

Patented Oct. 29, 1929

1,733,734

UNITED STATES PATENT OFFICE

CHARLES R. HULTGREN, OF CHICAGO, ILLINOIS, ASSIGNOR TO S. KARPEN & BROS., OF CHICAGO, ILLINOIS, A CORPORATION OF WEST VIRGINIA

PRESS DEVICE

Application filed June 6, 1927. Serial No. 196,766.

This invention relates particularly to a press device for securing together glued parts.

The primary object is to provide an improved device for enabling glued parts to be conveniently pressed together and securely held until the glue hardens.

The improved device enables furniture-parts, for example, to be pressed together and securely held, and enables the workmen to continue the assembling and pressing operations in quick succession.

The invention is illustrated in its preferred embodiment in the accompanying drawings, in which—

Fig. 1 represents a front elevational view of a press device embodying the invention; Fig. 2, a side elevational view of the same; Fig. 3, a section taken as indicated at line 3 of Fig. 1; Fig. 4, a broken front elevational view showing the portion of the shaft embodied and one of the clamping-frames mounted on the shaft; Fig. 5, a perspective view of an intermediate sofa leg pressed in the manner indicated in the upper portion of Fig. 3; Fig. 6, a perspective view of a corner sofa leg pressed in the manner indicated in the lower right hand portion of Fig. 3; and Fig. 7, a broken sectional view showing a modified form of screw-connection between a clamp-screw and clamping-frame.

In the preferred embodiment illustrated in the drawings, A designates a main frame mounted on caster A', the frame A being equipped with bearings $A^2$; B, a revoluble shaft having its end portions mounted in the bearings $A^2$, one or both of said bearings being capable of holding the shaft against turning, except when it is desired to turn; and B' and $B^2$, clamp-frames fixedly secured to the shaft B, said clamp-frames being provided with suitable clamping-shoulders and equipped with suitable clamping-screws.

The frame A may be of any suitable construction. Preferably, it comprises a pair of end standards 1; top connecting members 2; and bottom connecting members 3. Each end standard 1 preferably comprises a pair of vertical members $1^a$ having diverging lower portions $1^b$, a bottom connecting member $1^c$, and a top connecting member $1^d$. The whole main frame may be conveniently formed of angle iron, or structural steel members, joined together by rivets, as illustrated.

The bearings $A^2$ are mounted on members 4 which connect the members $1^a$ of the end standards at an intermediate point.

The shaft B is equipped with collars 5 which embrace one of the bearings $A^2$ and prevent longitudinal shifting of the shaft. The other bearing $A^2$ is a divided bearing whose upper member 6 is secured to the bottom member by cap-screws $6^a$. As will be understood from Fig. 2, the bearing may be tightened upon the shaft, so that the shaft will turn only when force is applied by the workmen to effect rotation.

The clamping-frame B' is provided with a hub 7 equipped with a set screw 8 which engages a slot 9 with which the shaft B is provided. Thus, the clamping-frame B' may be adjusted towards or away from the clamping-frame $B^2$ without angular displacement.

The clamping-frame $B^2$ is equipped with a hub 10 which is fixedly secured to the shaft B by means of a set screw 11.

The clamping-frames B' and $B^2$ are of light construction and are fixed upon the shaft B in corresponding angular positions.

Each clamping-frame preferably comprises a pair of cross-arms formed integrally with each other in such manner as to provide a rectangular hub-portion 12 and radial arms $12^a$.

The arms $12^a$ are provided with radial slots 13 which are of sufficient width to admit parts which are to be pressed. At the inner ends of the slots 13 are the clamping-shoulders $13^a$.

The slotted arms $12^a$ meet at the corners of the rectangular hub 12, forming right angular junctions, the arms adjacent these junctions affording flat clamping-shoulders 14.

Each of the arms $12^a$ constitutes, in effect, a pair of spaced bars. The outer ends of the arms are equipped with transverse bars 15 which are formed integrally with the arms. The bars 15 project beyond the outer lateral surface of the arms $12^a$, thus affording extensions $15^a$.

Each of the bars 15 is equipped centrally with a clamping-screw 16 having threaded engagement with the bar; and the extensions 15ᵃ are equipped with clamping-screws 17 having threaded engagement with the extensions. The central clamping-screws 16 carried by each arm co-act with the clamping-shoulders 13ᵃ at the inner ends of the slots 13; and the clamping-screws 17 co-act with the clamping-shoulders 14 near the junctions of the arms.

The hub-portion 7 of the clamp-frame B' is formed integrally with the rectangular hub-portion 12. Similarly, the hub-portion 10 of the clamp-frame B² is formed integrally with the rectangular hub-portion of the frame.

The inner ends of the clamping-screws are fitted with revoluble clamping-heads 18, and the outer ends of the clamping-screws are equipped with fixed cross-heads 19.

In Fig. 7, the clamping-screw 17 is shown in threaded engagement with a bushing 20 which is inserted through a perforation in the arm-extension 15ᵃ. The bushing is inserted from the inner side of the extension and is provided with a flange 20ᵃ to hold the bushing when the clamping-screw exerts outward pressure.

Fig. 6 shows a corner leg for a chair, or sofa, designated 21. The upper end portion of the leg is equipped with blocks 21ᵃ which may be assumed to be glued to the leg 21, dowel-pins being also used, if desired. The manner in which the glued parts are pressed and held together to form the corner leg is illustrated in the lower right hand portion of Fig. 3. It will be noted that two of the clamping-screws 17 are utilized to press the blocks 21ᵃ against the head-portion of the leg 21 in one of the corner-clamps of the clamp-frame B'.

In Fig. 6, 22 designates an intermediate leg for a sofa, for example, whose upper end portion has glued thereto blocks 22ᵃ. The manner in which the parts are clamped together is illustrated in the upper portion of Fig. 3. It will be observed that the blocks and head-portion of the leg are introduced into one of the slots 13, and a central clamping-screw 16 is employed to clamp the parts against the shoulder 13ᵃ at the inner end of the slot with which the arm 12ᵃ is provided.

Other illustrations of the manner in which the improved clamping device can be employed could be given, but this is thought to be unnecessary.

In some instances, it may be desirable to glue spaced blocks to a member, either at the end portions of said member, or at intermediate portions. In such case, the clamp-frames B' and B² may be so adjusted with relation to each other on the shaft B as to bring the parts which are to be clamped within the range of action of both clamp-frames. In this manner, blocks may be clamped to a member extending parallel with the shaft B, the blocks being in spaced relation, corresponding with the spacing of the clamp-frames B' and B².

In Fig. 3, one of the corner clamps of the frame B' is shown loaded. The clamping may be effected while the frame B' is in any desired angular position, as the workman may prefer. The workman may also load an adjacent intermediate clamp, then the succeeding corner clamp, etc. He may rotate the clamp-frame as desired to best suit his convenience in performing the work. A single workman may load succeeding portions of both clamp-frames B' and B², or two workmen may cooperate, if desired. The loading may be effected at the front of the machine and the work may finally be removed at the front side of the machine, after making a complete rotation; or the glued members may be removed at any desired point after the glue has hardened.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A clamping device comprising a clamp-frame having arms forming a cross and forming clamping-shoulders adjacent the intersections of the arms, and clamping-screws mounted on said clamp-frame and cooperating with said shoulders.

2. A clamping device comprising cross-arms provided adjacent their intersections with clamping-shoulders, said cross-arms being provided with slots whose inner ends afford clamping-shoulders, and clamping-screws mounted on said arms and cooperating with said clamping-shoulders.

3. A clamping device provided with a clamp-frame having arms forming a cross and forming clamping-shoulders adjacent the corners formed by the junctions of said arms, and a pair of clamping-screws mounted on and disposed longitudinally of each arm and cooperating with the opposed clamping-shoulders.

4. A clamping device comprising a clamp-frame provided with cross-arms affording clamping-shoulders adjacent the corners formed by the junctions of the cross-arms, said cross-arms being provided with slots whose inner ends afford clamping-shoulders, cross-heads at the outer ends of said arms provided with extensions, a central clamping-screw carried by each cross-head, and a pair of clamping-screws carried by the extensions of each cross-head.

5. A clamping device comprising a main frame, a shaft mounted in said frame, a clamp-frame mounted on said shaft and equipped with radial arms which form a cross and form clamping-shoulders adjacent the intersections of said arms, and clamping-screws mounted on and disposed longitudinally of said arms and opposed to said clamping-shoulders.

6. A clamping device comprising a main frame, a shaft mounted in said frame, and a pair of clamping devices mounted on said shaft in fixed angular relation but adjustable towards and away from each other, each clamping device comprising a clamp-frame having a plurality of radial arms and provided with a plurality of clamping-shoulders adjacent the intersections of said arms, and clamping-screws mounted on the outer end portions of said arms and opposed to said clamping-shoulders.

7. A clamping device comprising a rotatable clamp-frame equipped with a plurality of arms, said arms being slotted to form at their inner ends clamping-shoulders, and clamping-screws cooperating with said clamping-shoulders.

8. A clamping device comprising a main frame, a shaft having connections with said frame permitting the shaft to be turned by the exertion of force, and a clamp-frame angularly fixed on said shaft, said clamp-frame being provided with a plurality of cross-arms which form clamping-shoulders at their intersections and being also equipped with clamping-screws opposed to said shoulders.

9. A clamping device comprising a shaft, a clamp-frame comprising a plurality of radial arms, a hub-portion formed by the intersection of said arms and forming fixed clamping-shoulders, and clamping-screws carried by said frame and opposed to said clamping-shoulders.

10. A clamping device comprising a main frame, a shaft mounted in said frame, a pair of adjustably related clamp-frames mounted on said shaft, said frames being provided with cross-arms forming clamping-shoulders at their intersections, and a plurality of clamping-screws mounted on said clamp-frame and opposed to the clamping-shoulders thereof.

CHARLES R. HULTGREN.